May 12, 1953  O. G. LANDSVERK ET AL  2,638,551
RADIATION EXPOSURE METER
Filed Dec. 5, 1949
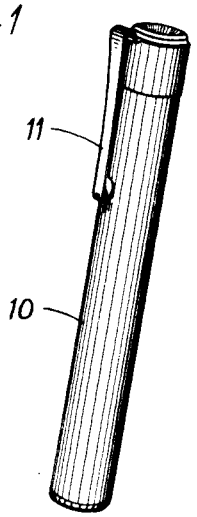
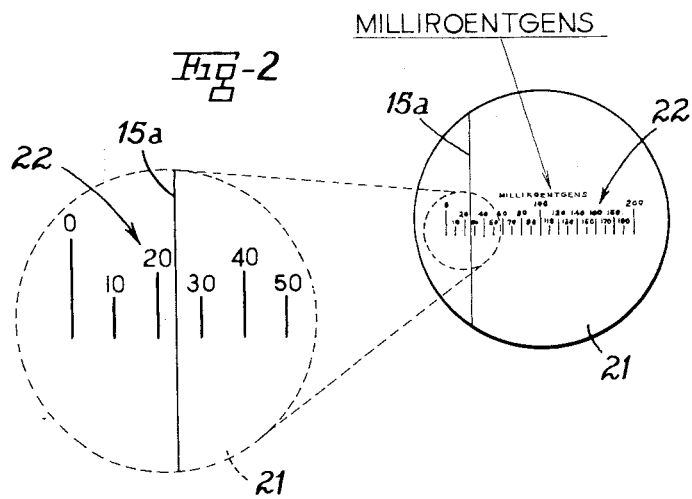
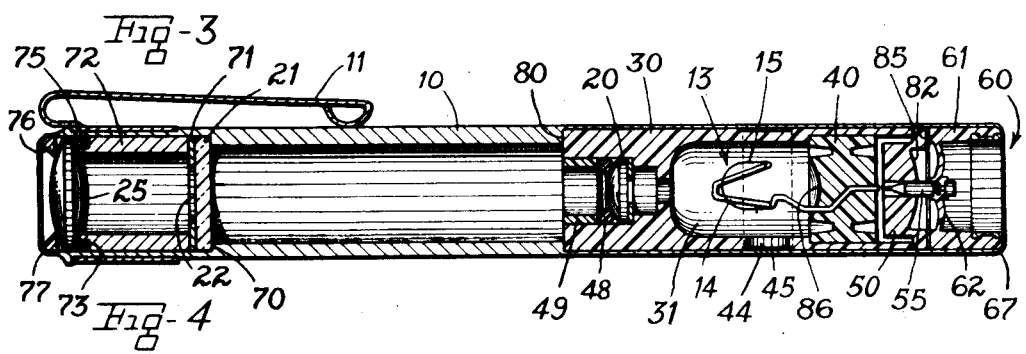
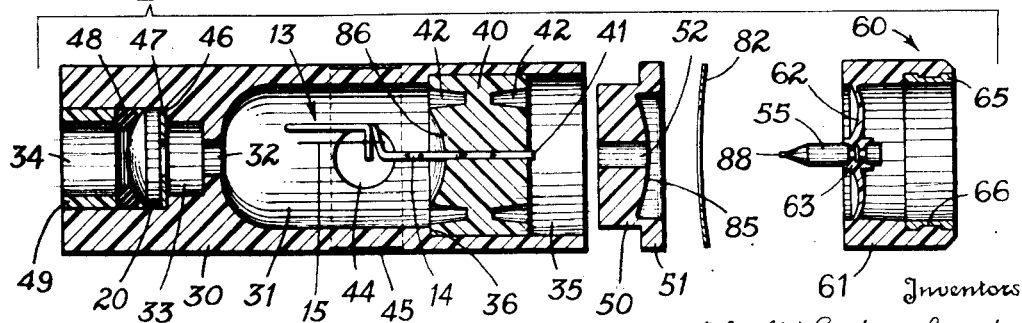
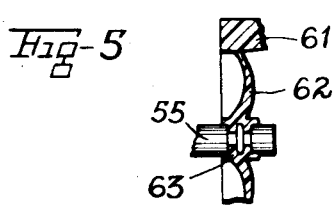
Inventors
Ole G. Landsverk and
Leonard C. Rasmussen
By Marechal & Biebel
ATTORNEYS Patented May 12, 1953

2,638,551

UNITED STATES PATENT OFFICE 2,638,551

RADIATION EXPOSURE METER

Ole G. Landsverk and Leonard E. Rasmussen, Cincinnati, Ohio, assignors to Keleket X-Ray Corporation, a corporation of Ohio Application December 5, 1949, Serial No. 131,091

9 Claims. (Cl. 250—83.3)

This invention relates to devices for measuring radioactivity, and more particularly to instruments which include an electrometer for measuring the amount of exposure to radiation such as X-rays or gamma radiation by determining the ionization caused by the radiation to be measured and its resulting effect on the electrometer.

In connection with work having to do with radio-active materials and the like, it is highly important to provide proper protection for the personnel who are subjected to such radiation. Experience has shown that there is a maximum permissible amount of radiation to which individuals may safely be subjected in any period of time, while radiation in excess of that amount is dangerous and should not be knowingly permitted. It is desirable, therefore, to provide a suitable integrating type of radiation sensitive device which may be carried directly upon the person of the individual who is engaged in this type of work, so that it will be carried by him constantly and thus subjected to the same radiation conditions to which he is subjected. By suitably calibrating the instrument, it thus becomes possible to ascertain at any time the total effective amount of radiation to which he has been subjected, and by proper periodic checks, to guard and protect him against excessive exposure, when the instrument indicates that he has received the maximum permissible amount of exposure.

It is accordingly important in such an instrument that it be light in weight, convenient to carry, relatively strong and rugged in construction and operation, making it possible for the user to carry it much as he would an instrument such as a fountain pen or the like, and without requiring conscious thought on his part, and with adequate assurance that when so carried and constantly associated with the wearer, it will properly integrate and indicate the summation of the radiation conditions to which he has been subjected. A suitable instrument for this purpose consists of a small electrometer, such as a quartz fiber electrometer, which may be mounted in a tube or other suitable housing provided with a microscope and scale for observing and measuring the movements of the quartz fiber resulting from dissipation of the charge initially applied thereto under the ionization effects of radiation. Such a device has been found to have the desired sensitivity, to be small enough for convenient carrying, and to have the proper ruggedness to withstand ordinary usage.

In the use of such an instrument, it is first charged by application of a predetermined electrical charge to the quartz fiber, causing a deflection of that fiber to occur to a maximum position, which may be indicated as a zero reading on the scale. As the device is subjected to radioactivity, the charge causing such deflection is progressively dissipated, and this results in causing a deflection of the fiber. This deflection is observed upon the scale, which may be conveniently calibrated from zero to a desired fraction or the total of the permissible radiation to which the user may be subjected in any one time period. Thus as the charge is progressively lost due to prolonged exposure to radioactivity, the fiber increasingly deflects toward the position it occupies in the absence of such charge, and thus the reading of the scale increases up to a predetermined maximum beyond which the user should not be allowed to be exposed to any additional radiation in that period.

One of the principal objects of the invention is to provide an instrument of this character for measuring exposure to radiation which is simple to construct and use, which may be readily attached to the clothes or person of the user, which is accurate and dependable in operation over a wide range of temperature and service conditions, which is capable of standing considerable shock without loss of accuracy or operating effectiveness, and which is hermetically sealed to assure maintenance of its accuracy even if immersed in water or other conducting fluid.

Another object is to provide such a device having an electrometer and a microscope wherein the electrometer and the objective lens of the microscope are assembled in properly spaced and fixed relation in the ionization chamber before these parts are mounted in the tube or the housing of the device and thus to facilitate obtaining and retaining the proper focused relation of the electrometer and microscope for accurate operation of the device.

Still another object is to provide such a measuring device wherein certain of the parts for supporting or shielding the electrometer are formed with lens surfaces which cooperate to concentrate the light entering the housing upon the electrometer in proper alignment with the microscope to give uniformly clear illumination of the electrometer and the scale free from dark spots and undesirable shadows.

It is also an object of the invention to provide a radiation exposure measuring instrument having a movable charging pin which is normally supported in spaced relation with the electrometer, which is shielded electrostatically from the electrometer to minimize deflection of the electrometer fiber resulting from either physical separation of the pin and electrometer or from the subsequent discharge of the charge on the pin, and which is also physically shielded against accidental contact with the electrometer as a further safeguard against unintentional discharging of the electrometer.

A further object is to provide an instrument for measuring radiation exposure in which the component parts may be quickly and easily assembled without the use of threads or other mechanical fastening devices.

Other objects and advantages will be apparent from the following description, the accompanying drawings and appended claims.

In the drawings—

Fig. 1 is a perspective view of the radiation measuring device in accordance with the invention;

Fig. 2 is a somewhat diagrammatic view showing the image visible to the user of the device and including an enlarged fragment of the image for clarity of illustration;

Fig. 3 is a view of the device in longitudinal section and on an enlarged scale;

Fig. 4 is a further enlarged exploded sectional view of certain of the component parts of the device taken at right angles to Fig. 3; and Fig. 5 is a still further view of a fragment of Fig. 4.

Referring to the drawing, which illustrates a preferred embodiment of the invention, the housing of the device is a barrel 10 of a material which will freely transmit the radiation to be measured. The barrel 10 is of approximately the same size and shape as a conventional fountain pen, and it is provided with a clip 11 for mounting the device in the pocket of the user, the ring portion of clip 11 being set in a circumferential groove in the barrel as shown in Fig. 3. As an example of suitable dimensions for the device, satisfactory results have been obtained with the barrel 10 formed of a tube of anodized aluminum approximately three and two-thirds inches in length and one-half inch in diameter, the dimensions of the other parts in the drawing being shown as in proportion to this size of tube. Within the barrel 10 is the electrometer 13, which comprises an electrode 14 of Phosphor bronze or other suitable conducting material supporting a quartz fiber 15 soldered or otherwise secured thereto. The fiber 15 has a coating of platinum or other conducting material, and fiber of other materials having or provided with the proper conductivity can be used, such as tungsten, glass or plastic.

The microscope includes a plano-convex lens 20 and a double-convex eyepiece 25, and a glass disk 21 having scale designations 22 thereon is positioned between these two lenses for measuring the position of fiber 15 as viewed through the microscope. It will be noted that only a single eyepiece lens is used, as contrasted with the double lens eyepiece ordinarily employed in microscopes of this type, thus materially simplifying assembly of the instrument and facilitating economical production. The cost of the instrument can be further reduced by employing a double-convex objective lens if desired, and the overall length of the instrument can be further reduced by employing an objective lens system of shorter focal length.

The electrometer 13 and the objective lens 20 are mounted in fixed relation as parts of a unitary subassembly within a separately formed housing 30 which forms an ionization chamber 31 for the electrometer. It is desirable that the proportions of the housing 30 and chamber 31 and the average atomic number of the materials forming the wall of the chamber be such as to satisfy the Bragg-Gray conditions for an "airwall" chamber, and satisfactory results from this standpoint have been obtained with the housing 30 formed of an injection or compression molded material such as black polystyrene or a phenolic resin.

Three connecting passages 32, 33 and 34 of progressively greater diameter lead from the chamber 31 in the direction of the microscope, and at the opposite end of chamber 31, the housing 30 is formed with an enlarged bore 35 terminating in an annular shoulder 36 forming a seat for the insulator 40 which supports the electrometer. It is desirable that the insulating properties of the insulator 40 be high, particularly if the device is designed to operate at relatively low capacity. For example, if the electrometer has a capacity of the order of 1.7 mmfd. and is charged at 150 volts, adequate protection from the standpoint of the prevention of leakage is obtained if the effective resistance of the insulator 40 is of the order of $10^{20}$ ohms, in which case the leakage averages less than approximately 1 volt in 24 hours.

The insulator 40 also serves to transmit the light for illuminating the electrometer. Satisfactory results from the standpoint of both insulating and light transmitting properties have been obtained with this insulator molded from transparent polystyrene with a diameter of the order of .40 inch and an axial length of the order of .25 inch, and the electrode 14 includes angularly arranged portions around which the insulator is molded to provide for rigidly supporting the electrometer. The outer end 41 of the electrode projects beyond the outer end of the insulator to provide a connection for charging the electrometer, and both of the end surfaces of the insulator are shown as formed with relatively deep annular grooves 42 to provide an extended surface leakage path from the electrode 14, tending to reduce the loss of electrostatic charge. The electrometer is thus firmly supported by the insulator 40, and the latter is similarly firmly supported within the bore 35 of housing 30 to assure a rugged construction minimizing likelihood of accidental discharge or other undesirable effects on the electrometer in the event of shock or when the device is dropped.

Before the electrometer and insulator are assembled in the housing 30, the fiber 15 is provided with a suitable conducting coating, as by sputtering with platinum or other suitable metal. Also, in order to control secondary radiation from the electrode 14 resulting from the photoelectric effect, and thus to obtain effectively uniform gamma radiation sensitivity in the instrument as a whole over substantially the entire X- and gamma ray spectrum, as much of the surface of the electrode as possible is coated with a suitable material of low atomic number, satisfactory results having been obtained by painting the electrode with a suspension of colloidal graphite in a carrier which will adhere to the electrode, such as the rubbery material sold under the trade name "Insulex No. 22."

The surface of ionization chamber 31 should be conducting and have no dead spots, and it should be grounded to the barrel 10. The non-conducting housing 30 is accordingly provided with a coating on the inner surface of the chamber 31 which is sufficiently conductive to remove positive ions formed in chamber 31 by radiation such coating being continuous to its outer surface to assure electric contact with the barrel 10. The actual conductivity required for this coating is relatively low, tests indicating that a resistance of $10^8$ ohms is not too high, and satisfactory results have been obtained by dipping the housing in a suspension of colloidal graphite in a solvent for the material composing the housing, such as acetone in the case of polystyrene. The solvent softens the surface of the housing sufficiently to cause the graphite to be imbedded therein and thus to form the desired conducting coating, and loose particles remaining on the surface of the housing may then be readily removed by polishing in a lathe.

It has been found that if this conducting coating covers the entire housing 30, particles of the graphite may become detached during assembly of the device and enter the open part of the barrel between the objective lens 20 and the scale disk 21, where they tend to obscure proper reading of the instrument. Accordingly, it is desirable to limit the painting or dipping of the housing to the portion extending from its right-hand end in the drawing to approximately the level of the passage 32. Particles of the graphite which may be detached from the housing during use of the instrument can be prevented from interfering with its operation by coating the wall of the chamber 31 and also the wall of the barrel between the lens 20 and the disk 21 with a suitable conducting grease such as a silicone grease thoroughly mixed with graphite.

If desired, the housing 30 may be formed of a material which itself possesses the desired conductivity, such as a phenolic resin containing a conducting material or a molded mixture of graphite and methyl methacrylate. As pointed out above, however, care should be taken to utilize materials of appropriate average atomic numbers in order to control secondary radiation in the ionization chamber resulting from photoelectric action in the presence of the radiation to be measured, which would cause the device to read too high. Similarly if the barrel 10 is formed of a suitably strong plastic material which possesses the desired conductivity and freedom of passage for radiation, the housing 30 may be molded integrally with the barrel or separately formed as shown, and the ends of the barrel may be post-formed, i. e., formed after assembly of the other parts therein, in a manner comparable to the peening of the ends of the metal barrel to seal the parts in assembled relation.

In assembling these parts in the housing 30, the insulator 40 is inserted within the bore 35 until it seats on the shoulder 36, and it is then bonded in place by means of a suitable mutual solvent for the plastic materials, such as acetone when both the housing 30 and insulator 40 are formed of polystyrene. The objective lens 20 is then inserted from the opposite end in the passage 34, and before the lens is secured in position, the fiber 15 may be adjusted as required into proper position in the field of lens 20 by inserting a suitable tool through an opening 44 provided in the wall of chamber 31. This hole is shown as sealed with cellulose sealing tape 45 prior to insertion of the unit in barrel 10, and a groove is formed in the surface of housing 30 to receive this tape, which also serves to shield the hole 44 against the passage of secondary electrons emitted from the wall of barrel 10.

The objective lens 20 is then adjusted into accurately focused relation with the fiber 15 to position the loop of the fiber in the focal plane of the lens. This focusing is accomplished by means of an annular spacer 46 inserted between the lens and the shoulder 47 at the inner end of passage 34. This spacer also forms an optical aperture for the microscope aligned with and of the same diameter as the passage 32, and it has been found desirable to have available a plurality of these spacers of different thicknesses, ranging from 0.10 to 0.20 inch, which may be used selectively in the assembly of each instrument to adjust the lens to the proper spacing with respect to the fiber 15.

After a selected spacer 46 of the proper thickness is in place, the lens 20 is secured and sealed in position by means of a rubber O-ring 48 and a sleeve 49 of polystyrene or other suitable plastic, which is compressed against the O-ring 48 and secured in position by a solvent bond with the inner wall of passage 34. In this way, the lens 20 held securely in position even under conditions of substantial temperature ranges, since differences in thermal expansion between the lens 20 and the housing 30 are compensated for by the O-ring 48, which maintains pressure on the lens at all times to hold it firmly in position.

It is thus assured that the lens 20 and the electrometer fiber 15 will remain in accurately focused relation unaffected by temperature changes, since with the housing 30 and insulator 40 formed of the same plastic material, or different materials having the same coefficient of expansion, and secured together by a solvent bond, there will be no differential expansion of these parts. Also, with the insulator 40 of substantial length as shown and with the resulting large area of its peripheral surface thus permanently secured to the inner wall of housing 30, a firm and rigid support is provided for the electrometer, minimizing the possibility of permanent deflection of the fiber under shock. Assurance is also provided against the possibility of the loop portion fiber 15 catching on or being accidentally forced through the adjacent large loop portion of electrode 14, since the ends of the fiber extend around the outside of the offset portions of electrode 14 to which they are secured, and the fiber thus crosses the wire of the electrode twice at relatively large angles.

Adjacent the insulator 40 is a member 50 which forms an electrostatic shield minimizing deflection of the electrometer fiber after it is separated from the charging source of voltage. This shield 50 transmits the light from the outer end of the barrel 10 to the electrometer and includes a circumferential shoulder 51 which seats on the outer end of the housing 30 to maintain the inner surface of the shield and the exposed end 41 of electrode 14 in spaced relation, and the shield 50 has a central bore 52 for receiving and guiding the charging pin 55 for the electrometer. As shown in Fig. 3, pin 55 normally is withdrawn within bore 52 following a charging operation.

The shield includes conducting material grounded to barrel 10 so that there will be no disturbing effect on the electrometer resulting from the charge remaining on the pin 55 upon retraction of the pin following charging of the device. Satisfactory results from standpoints of both light transmission and conductivity have been obtained by molding the shield 50 of transparent polystyrene and by gently rubbing ground crystalline graphite into the surface of the shield extending from the inner end of the bore 52 around both of the end surfaces and the periphery of the shoulder 51 to assure electric contact with the inner wall of barrel 10, care being taken to keep the resulting graphite coating sufficiently thin to avoid undesirable absorption of light. The coating, however, is not in contact with pin 55 at any time, since the end of the pin is tapered as shown to maintain clearance in both its advanced or charging position and in its normal retracted position.

A diaphragm assembly indicated generally at 60 is mounted in the outer end of barrel 10 to seal the barrel and to support the charging pin 55. This assembly includes a sleeve portion 61 and a flexible diaphragm portion 62 molded integrally therewith, and it also includes a central portion 63 of increased thickness which surrounds the charging pin 55, the pin being provided with circumferential grooves as shown into which the material of the diaphragm is molded to form an interlocked construction. At the outer end of this assembly is a supporting ring 65 of aluminum or other suitable metal, which is provided with a circumferential groove 66 into which the material of the sleeve portion 61 of the diaphragm unit is integrally molded. This ring 65 supports the outer end of the sleeve 61 when the outer end of the barrel 10 is peened over at 67 to secure these parts in place, and it also aids in maintaining the seal between sleeve 61 and the barrel in the event of differential transverse expansion of the parts under changing conditions of temperature.

It is desirable to have the diaphragm assembly 60 of such properties as to assure hermetic sealing of the barrel while still providing for establishing contact of the charging pin 55 with the outer end 41 of the electrode 14. In addition, the diaphragm 62 should be adequately light transmitting to admit the desired light for illumination of the electrometer and scale, and it should possess sufficient insulating properties to prevent short circuiting of the source of charging voltage. Satisfactory results from both of these standpoints have been obtained from the diaphragm and sleeve molded from transparent cellulose acetate butyrate, and with the pin 55 formed of stainless steel and grooved as shown to provide for molding the center portion of the diaphragm in interlocked relation therewith. However, since the butyrate does not wet stainless steel, additional sealing is provided adjacent the pin by applying a coating of a suitable flexible adhesive such as Glyptal to the junction of the pin with web portion 63.

The shape of the diaphragm 62 as shown, with a single annular convolution between the sleeve 61 and the central portion 63, has been found helpful in reducing undesirable refractive effects. In addition, it will be noted that the diaphragm is substantially thicker adjacent its central portion 63 than adjacent its peripheral connection with the sleeve portion 61, for example a thickness range from a maximum of the order of 0.011 inch to a minimum of the order of 0.005 inch for a diaphragm assembly approximately 0.375 inch in diameter. With this variation in thickness, flexing of the diaphragm takes place primarily in its outer portions, thus protecting the Glyptal coating against cracking such as might result from excessive flexing of the inner portion of the diaphragm. Also, with the flexing of the diaphragm taking place primarily at its periphery, less total flexing is required for a given amount of movement of pin 55, thus reducing wear on the diaphragm as a whole and prolonging its useful life. With these proportions of the diaphragm and associated parts, the pin 55 can be moved from its retracted position shown in Fig. 2 through a distance of approximately 0.025 inch with a pressure of about 2.5 to 7 pounds.

At the eyepiece end of the device, the barrel 10 is counterbored to provide a portion of larger diameter terminating in an annular shoulder 70 which forms a seat for the scale disk 21, and it has been found desirable to secure the disk in position by applying a suitable adhesive to the shoulder 70 and the adjacent portion of the inner wall of the barrel before the disk is mounted in place, satisfactory results having been obtained by using B-7 Acryloid as the adhesive in the case of a glass disk 21 and aluminium barrel 10. A washer 71 is mounted adjacent disk 21 to form an optical aperture, and an aluminum spacer sleeve 72 is mounted between this washer and the eyepiece lens 25.

The outer end of sleeve 72 is provided with a circumferential groove 73 which receives an O-ring 75 against which the lens 25 is seated. An aluminum eyepiece ring 76 is positioned adjacent the outer surface of the lens, and these parts are shown as held in assembled relation by peening the outer end of barrel 10 as indicated at 77. Thus with the parts properly proportioned as shown the O-ring 75 is compressed against sleeve 72 and the wall of barrel 10 to seal the interior at this end of the valve and to hold lens 25 firmly under pressure preventing relative movement of these parts under conditions of differential expansion, and the eyepiece ring 76 holds lens 25 in recessed relation with the outer end of barrel 10 to protect the lens against abrasion or other injury in use.

In assembling the device, the eyepiece lens 25 and its associated parts are mounted in the barrel first. The sub-assembly of the housing 30 with the electrometer 13 and lens 20 is then inserted in the opposite end of the barrel until it seats on the annular shoulder 80, the housing 30 preferably being of such outer diameter as to have a sufficiently close fit in the barrel to prevent free rotation. During this assembly step, such rotational adjustment of the housing is made as may be necessary to assure that the image 15a of the fiber 15 is properly aligned with the calibrations of the scale 22 as indicated in Fig. 2. The electrostatic shield 50 is then inserted until its shoulder portion 51 seats on the outer end of chamber 30. Next a spring steel washer 82 formed with a cylindrically curved shape as shown in Fig. 4 is inserted in the barrel, and finally diaphragm assembly 60 is inserted and secured in position by peening over the outer end of the barrel, additional sealing being provided by applying a coating of B-7 Acryloid between the end of the barrel and sleeve 61 and permitting this coating to dry before the peening operation. The washer 82 serves as an optical aperture, shown as one-fourth inch in diameter, and it also exerts sufficient pressure longitudinally of the device to retain these parts firmly in assembled relation and thus to prevent relative movement of the parts in the event of differential expansion thereof under conditions of temperature change. It will also be noted that no threads are required on any of the parts as shown, thus considerably simplifying their manufacture and assembly as well as facilitating keeping the parts clean during assembly.

It will be apparent that with the charging pin 60 located in the center of the barrel in the substantially thickened portion 63 of the diaphragm 62, a considerable amount of the light which would normally be used for illuminating the electrometer is cut off. In order to compensate for this loss of the light in the center portion of the barrel and to assure adequate illumination of the electrometer for the microscope, the insulator 40 and the electrostatic shield 50 are formed with lens surfaces which concentrate the light and direct it in the desired alignment with the electrometer and microscope. As shown, the outer surface of the electrostatic shield forms a convex lens surface 85 which acts as a condensing lens for the hollow tube of light transmitted by the diaphragm 62 and washer 80 and causes the light rays to converge towards a point located between insulator 40 and the loop portion of fiber 15. The inner end of the insulator 40 is formed with a concave lens surface 86 which refracts the converging rays from lens surface 85 into a cone which is slightly convergent so that it would come to a focus just beyond the objective lens 20.

With the parts proportioned as shown, and with the radius of curvature of the surface 85 approximately .375 and the radius of curvature of the surface 86 approximately .203 inch, substantially all of the light transmitted by the diaphragm 62 and washer 82 is concentrated into a beam approximately $\frac{3}{32}$ inch in diameter which is directed through the similarly proportioned passage 32 and aperture of the spacer 47. It has also been found that with insulator 40 and shield 50 molded from transparent polystyrene as described, there is sufficient lack of definition on the part of the lens surfaces thereon and sufficient scattering of the light in traversing these parts as to give substantially uniform illumination of the electrometer and the scale 22 free from the dark spot or shadow which would normally be expected to result from the presence of the opaque charging pin 55 and the electrode portion 41 in the center of the field.

In the operation of the device, the electrometer is first charged by placing the outer end of the charging pin 55 in contact with a suitable external source of voltage and then forcing the pin inwardly by deflection of the diaphragm 62 until the pin is in contact with the outer end of electrode 14. The device is so adjusted that when fully charged, the image of the quartz fiber 15 will coincide with the zero mark on the scale 22, a suitable charging voltage being 150 volts in an instrument of the proportions given above. The calibrations of the scale may be chosen as desired in accordance with the radiation sensitivity of the instrument as a whole, and it is shown as calibrated in milliroentgens with a range from 0 to 200, the latter representing two-thirds of the accepted weekly tolerance for X- and gamma rays.

When the device is removed from the charging source, the charge which remains on the pin 55 would ordinarily cause substantial deflection of the electrometer fiber 15 if no provision for electrostatic shielding of the device were made, for example a deflection of the fiber through a total of as much as 20 mr. on the scale 22. This tendency to deflection, however, is greatly reduced by the provision of the electrostatic shield 50. As shown, when the pin 55 is in its normal retracted position, the conducting surface of shield 50 is approximately midway between the end of the pin and the adjacent end 41 of electrode 14. Thus when the charging pin 55 recedes from contact with the electrode and into the bore 52 in the shield, the electric field from the pin, which is already greatly restricted by the shield, is almost completely shut off from the electrometer, and subsequent discharge of the pin has almost no effect on the electrometer. During the initial retracting movement of the pin, before it has receded within bore 52, its effect on the electrometer is minimized by the construction of the end of the pin, which is formed with a point 88 of very small diameter, for example from 0.006 to 0.010 inch in diameter. Tests indicate that the average amount of deflection of the fiber 15 when the pin is retracted is only about 2 mr. on scale 22, with an additional 2 mr. resulting from the subsequent discharge of the pin.

After the instrument has thus been charged, it is ready for use and may be carried in the pocket or otherwise attached to the clothing or person of a user working in the presence of X- or gamma radiation. Ionization of the air within the chamber 31 causes neutralization of the charge on the electrometer, and the resulting movement of the fiber 15 registers this alteration in charge on the scale 22 in proportion to the total quantity of ionization. At the same time, any positive ions produced in the chamber 31 are removed by the conducting surface of the housing 30 to assure proper operation of the electrometer.

The instrument constructed and operating as described has been found to be highly satisfactory from the standpoint of both accuracy and strength in use under even severe service conditions. As pointed out, the O-rings and the spring washer 82 maintain pressure on the parts preventing looseness resulting from changes in temperature, and the device is also thus maintained in hermetically sealed condition and is not affected by changes in atmospheric pressure or by immersion in water or other conducting fluids. In addition, with the charging pin protected as shown by its recessed position within the open end of the barrel, there is little danger of accidental movement of the pin into such contact with the electrode 14 as to cause accidental discharge of the electrometer, and the device is accordingly highly reliable without requiring a separate removable cap at this end of the barrel.

In addition to the stability of the device under varying conditions of temperature and moisture, the device is strong and rugged from the standpoint of resistance to shock. As noted, the electrode carrying the electrometer is firmly supported and imbedded in the insulator 40 and the latter is similarly supported and secured within the housing 30, and this construction gives strong protection to the electrometer. As a result, repeated dropping of the instrument, or striking against a table or other hard surface will ordinarily not cause discharge of the electrometer or appreciable physical shifting of the fiber or other parts. The user can accordingly rely on the instrument to give an accurate reading of the radiation to which it has been exposed, thus assuring him of adequate protection against over exposure.

What is claimed is:

1. A device for measuring exposure to radiation comprising a supporting barrel, an electrometer mounted within said barrel, a microscope and a scale mounted in said barrel for observing and measuring the position of said electrometer, a contact member for charging said electrometer, a sealing member including an outer sleeve portion and a yieldable diaphragm portion, said diaphragm portion being light transmitting to provide light within said barrel for illuminating said electrometer, said contact member being supported in approximately the center of said diaphragm for movement therewith into and out of contact with said electrometer, and means forming a seal between said contact member and said diaphragm, said diaphragm being of progressively increasing thickness from the peripheral portion thereof adjacent said sleeve towards the center thereof to cause flexing of said diaphragm to take place primarily at the periphery thereof.

2. A device for measuring exposure to radiation comprising a supporting barrel, an electrometer including a conducting fiber mounted within said barrel, a microscope and a scale mounted in said barrel for observing and measuring the position of said electrometer fiber, a contact member for charging said electrometer, yieldable means supporting said contact member within said barrel in normally spaced relation with said electrometer for movement therewith into contact with said electrometer, said yieldable means being formed of light transmitting material to provide light within said barrel for illuminating said electrometer, a shield positioned between said yieldable means and said electrometer, said shield on the surface thereof adjacent said electrometer and having an aperture therethrough for receiving and guiding said contact member, and said shield including conducting material being of light transmitting material to transmit light from said yieldable means to said electrometer and extending from said aperture to said barrel forming an electrostatic shield for said contact member to minimize deflection of said electrometer fiber upon movement of said contact member out of contact therewith, said aperture in said shield being aligned with and proportioned to receive and guide said contact member while maintaining said contact member out of contact with said conducting material.

3. A device for measuring exposure to radiation comprising a supporting barrel, an electrometer mounted within said barrel, a microscope and a scale mounted in said barrel for observing and measuring the position of said electrometer, a contact member for charging said electrometer, yieldable means supporting said contact member within said barrel in normally spaced relation with said electrometer for movement therewith into contact with said electrometer, said yieldable means being light transmitting to transmit a hollow tube of light rays for illumination of said electrometer, lens means between said yieldable means and said electrometer for converging the light transmitted by said yieldable means upon said electrometer, and additional lens means between said converging lens means and said electrometer for diverging said tube of light to cause substantially uniform illumination of said electrometer and scale free from shadow resulting from the presence of said contact member in the field of view through said device.

4. A device for measuring exposure to radiation comprising a supporting barrel, an electrometer including a conducting fiber mounted within said barrel, a microscope and a scale mounted in said barrel for observing and measuring the position of said electrometer fiber, a contact member for charging said electrometer, yieldable means supporting said contact member within said barrel in normally spaced relation with said electrometer for movement therewith into contact with said electrometer, said yieldable means being light transmitting to provide for illumination of said electrometer, an annular member of light transmitting material positioned between said yieldable means and said electrometer and having an aperture therethrough for receiving and guiding said contact member, means forming a coating of conducting material on the surface of said annular member adjacent said electrometer, to form an electrostatic shield for minimizing deflection of said electrometer fiber upon movement of said contact member out of contact therewith, said conducting coating being sufficiently light transmitting to avoid undesirable absorption of light, and means forming a lens surface on said shield for concentrating the light transmitted by said yieldable means upon said electrometer.

5. A device for measuring exposure to radiation comprising a supporting barrel, an electrometer including conducting fiber mounted within said barrel, a microscope and a scale mounted in said barrel for observing and measuring the position of said electrometer fiber, a contact member for charging said electrometer, yieldable means supporting said contact member within said barrel in normally spaced relation with said electrometer for movement therewith into contact with said electrometer, said yieldable means being light transmitting to provide for illumination of said electrometer, conducting means of transparent material positioned between said yieldable means and said electrometer to form an electrostatic shield for minimizing deflection of said electrometer fiber upon movement of said contact member out of contact therewith, a transparent insulator positioned between said electrometer and said conducting means to support said electrometer, and means forming lens surfaces on said insulator and said conducting means cooperating to focus the light transmitted by said yieldable means on a position spaced between said electrometer and said scale to give substantially uniform illumination of said electrometer and said scale free from shadow resulting from the presence of said contact member within the field of view through said device.

6. A device for measuring exposure to radiation comprising a supporting barrel, an electrometer positioned within said barrel, a transparent insulator supporting said electrometer in said barrel, a microscope and a scale mounted in said barrel on the opposite side of said electrometer from said insulator for observing and measuring the position of said electrometer, a contact member for charging said electrometer, means supporting said electrometer in approximately the center of said barrel adjacent the end of said barrel opposite said microscope with said contact member blocking the light traveling centrally of said barrel, said supporting means being transparent to transmit a hollow tube of light to said electrometer and microscope, transparent means forming an electrostatic shield between said supporting means and said electrometer and having an aperture therethrough for receiving said charging member, means forming a convex lens surface on said shield for converging the hollow tube of light transmitted by said supporting means upon said electrometer for transmission to said microscope, and means forming a concave lens surface on said insulator causing said converged tube of light to diverge sufficiently to give substantially uniform illumination of said electrometer and said scale substantially free from shadow resulting from the presence of said contact member in the line of view through said device.

7. A device for measuring exposure to radiation comprising a supporting barrel; an electrometer unit adapted to be assembled separately from said barrel for insertion therein and including a housing member having a bore at one end thereof forming an ionization chamber, said bore having a counterbore in the outer end thereof providing an annular shoulder therewithin, an insulator received within said counterbore in seated relation with said shoulder and bonded to the adjacent wall of said housing, an electrometer carried by said insulator within said ionization chamber and having a charging connection extending therefrom through said insulator, said housing having a passage in the opposite end thereof connecting with the inner end of said ionization chamber and having a counterbore in the outer end thereof forming a second annular shoulder, an objective lens received within said passage in seated relation with said second shoulder, and means including a sleeve bonded within said passage outwardly of said lens to seal said lens in predetermined focused relation with said electrometer; means securing said housing within said barrel; and a scale and an eyepiece mounted in said barrel and cooperating with said objective lens to observe and measure the position of said electrometer.

8. A device for measuring exposure to radiation comprising a supporting barrel; an electrometer unit adapted to be assembled separately from said barrel for insertion therein and including a housing member having a bore at one end thereof forming an ionization chamber, said bore having a counterbore in the outer end thereof providing an annular shoulder therewithin, an insulator received within said counterbore in seated relation with said shoulder, said insulator and said housing being formed of materials having substantially the same coefficient of expansion and being solvent-bonded together to secure said insulator in fixed relation with said housing, an electrometer carried by said insulator within said ionization chamber and having a charging connection extending therefrom through said insulator, said housing having a passage in the opposite end thereof connecting with the inner end of said ionization chamber and having a counterbore in the outer end thereof forming a second annular shoulder, an objective lens received within said passage in seated relation with said second shoulder, a resilient sealing ring engaging said lens outwardly of said shoulder, and a sleeve solvent-bonded within said passage outwardly of and in compressing relation with said ring to secure said lens in predetermined focused relation with said electrometer; means securing said housing within said barrel; and a scale and an eyepiece mounted in said barrel and cooperating with said objective lens to observe and measure the position of said electrometer.

9. A device for measuring exposure to radiation comprising a supporting barrel; an electrometer unit adapted to be assembled separately from said barrel for insertion therein and including a housing member having a bore at one end thereof forming an ionization chamber, said bore having a counterbore in the outer end thereof providing an annular shoulder therewithin, an insulator received within said counterbore in seated relation with said shoulder, said insulator and said housing being formed of materials having substantially the same coefficient of expansion and being solvent-bonded together to secure said insulator in fixed relation with said housing, an electrometer carried by said insulator within said ionization chamber and having a charging connection extending therefrom through said insulator, said housing having three connecting passages of progressively greater diameter leading from said chamber in the opposite direction from said insulator and open at the outer end thereof, an objective lens received within the outermost of said passages, an annular spacer received between said lens and the inner end of said outermost passage, said spacer being of substantially the same diameter as the innermost said passage to form an optical aperture for said lens and being of predetermined thickness to position said lens in focused relation with said electrometer, and means including a sleeve bonded within said passage outwardly of said lens to seal said lens in said focused relation with said electrometer; means securing said housing within said barrel; and a scale and an eyepiece mounted in said barrel and cooperating with said objective lens to observe and measure the position of said electrometer.

OLE G. LANDSVERK.
LEONARD E. RASMUSSEN.

References Cited in the file of this patent

UNITED STATES PATENTS

| Number | Name | Date |
|---|---|---|
| 2,465,886 | Landsverk et al. | Mar. 29, 1949 |

OTHER REFERENCES

Atomic Energy Commission Document, MDDC 395, Dec. 13, 1945.

Atomic Energy Commission Document, MDDC 885, Jan. 17, 1947.

Atomic Energy Commission Document, MDDC 396, Apr. 22, 1946, pages 3 and 5.